(12) United States Patent
Ranade

(10) Patent No.: US 7,039,661 B1
(45) Date of Patent: May 2, 2006

(54) COORDINATED DIRTY BLOCK TRACKING

(75) Inventor: Dilip M. Ranade, Pune (IN)

(73) Assignee: VERITAS Operating Corporation, Mountain View, CA (US)

( * ) Notice: Subject to any disclaimer, the term of this patent is extended or adjusted under 35 U.S.C. 154(b) by 162 days.

(21) Appl. No.: 10/747,782

(22) Filed: Dec. 29, 2003

(51) Int. Cl.
G06F 17/30 (2006.01)

(52) U.S. Cl. .................. 707/204; 707/202; 707/203; 707/206; 709/223; 711/162; 714/5; 714/6

(58) Field of Classification Search ................ 707/10, 707/100, 104.1, 204, 3, 203, 205, 206, 201, 707/202; 709/219, 223; 711/162, 202; 714/5, 714/6, 15
See application file for complete search history.

(56) References Cited

U.S. PATENT DOCUMENTS

| | | | |
|---|---|---|---|
| 4,507,751 A * | 3/1985 | Gawlick et al. ............ 707/202 |
| 5,241,668 A * | 8/1993 | Eastridge et al. ........... 707/202 |
| 5,280,611 A | 1/1994 | Mohan et al. .............. 395/600 |
| 5,375,232 A * | 12/1994 | Legvold et al. ............ 711/162 |
| 5,448,718 A * | 9/1995 | Cohn et al. ................. 707/204 |
| 5,485,608 A | 1/1996 | Lomet et al. ............... 395/600 |
| 5,524,205 A | 6/1996 | Lomet et al. .......... 395/182.14 |
| 5,530,855 A * | 6/1996 | Satoh et al. ................ 707/201 |
| 5,640,561 A * | 6/1997 | Satoh et al. ................ 707/202 |
| 5,774,668 A * | 6/1998 | Choquier et al. ........... 709/223 |
| 5,819,292 A | 10/1998 | Hitz et al. .................. 707/203 |
| 5,842,222 A * | 11/1998 | Lin et al. .................... 707/202 |
| 5,907,672 A | 5/1999 | Matze et al. ........... 395/182.06 |
| 5,918,229 A | 6/1999 | Davis et al. .................. 707/10 |
| 5,951,694 A * | 9/1999 | Choquier et al. ............. 714/15 |
| 5,991,772 A * | 11/1999 | Doherty et al. ............. 707/202 |
| 5,995,980 A * | 11/1999 | Olson et al. ................ 707/201 |
| 6,052,797 A | 4/2000 | Ofek et al. ..................... 714/6 |
| RE37,038 E * | 1/2001 | Eastridge et al. ............... 714/5 |
| 6,173,293 B1 | 1/2001 | Thekkath et al. ........... 707/201 |
| 6,189,011 B1 * | 2/2001 | Lim et al. .................... 707/102 |
| 6,219,800 B1 | 4/2001 | Johnson et al. ................. 714/5 |
| 6,223,269 B1 * | 4/2001 | Blumenau ................... 711/202 |
| 6,226,651 B1 * | 5/2001 | Masuda et al. ............. 707/202 |
| 6,233,588 B1 * | 5/2001 | Marchoili et al. .......... 707/200 |
| RE37,364 E * | 9/2001 | Cohn et al. ..................... 714/6 |
| 6,289,356 B1 | 9/2001 | Hitz et al. ................... 707/201 |
| 6,438,538 B1 * | 8/2002 | Goldring ....................... 707/3 |
| 6,449,625 B1 * | 9/2002 | Wang ......................... 707/206 |
| 6,449,734 B1 * | 9/2002 | Shrivastava et al. .......... 714/15 |
| 6,658,590 B1 | 12/2003 | Sicola et al. .................... 714/6 |
| 6,889,231 B1 * | 5/2005 | Souder et al. ............ 707/104.1 |

(Continued)

Primary Examiner—Shahid Alam
(74) Attorney, Agent, or Firm—Campbell Stephenson Ascolese LLP; D'Ann Naylor Rifai

(57) ABSTRACT

A method, system, computer system, and computer-readable medium to maintain consistent, up-to-date copies of primary data that enable quick resumption of operations upon failure of the primary node, the secondary node, and/or the network connecting nodes. The current status of individual storage locations is tracked, indicating whether data in each individual storage location is synchronized between a primary node and a secondary node. Transaction logging by a transaction-logging application, such as a file system or database system, is used to track individual storage locations updated with each transaction. Acknowledgements of these updates are tracked during replication to determine whether individual storage locations containing primary and secondary data are synchronized. This coordinated transaction logging and acknowledgement tracking enables write operations and replication to be performed efficiently while maintaining the information necessary to resynchronize only individual storage locations when primary and secondary data become unsynchronized.

39 Claims, 7 Drawing Sheets

U.S. PATENT DOCUMENTS

| | | | |
|---|---|---|---|
| 2002/0091670 A1 | 7/2002 | Hitz et al. | 707/1 |
| 2003/0097611 A1 | 5/2003 | Delaney et al. | 714/13 |
| 2003/0217119 A1* | 11/2003 | Raman et al. | 709/219 |
| 2004/0010499 A1 | 1/2004 | Ghosh et al. | 707/100 |
| 2004/0158588 A1* | 8/2004 | Pruet | 707/204 |
| 2004/0254964 A1* | 12/2004 | Kodama et al. | 707/204 |

* cited by examiner

*Logging and Replication Environment*

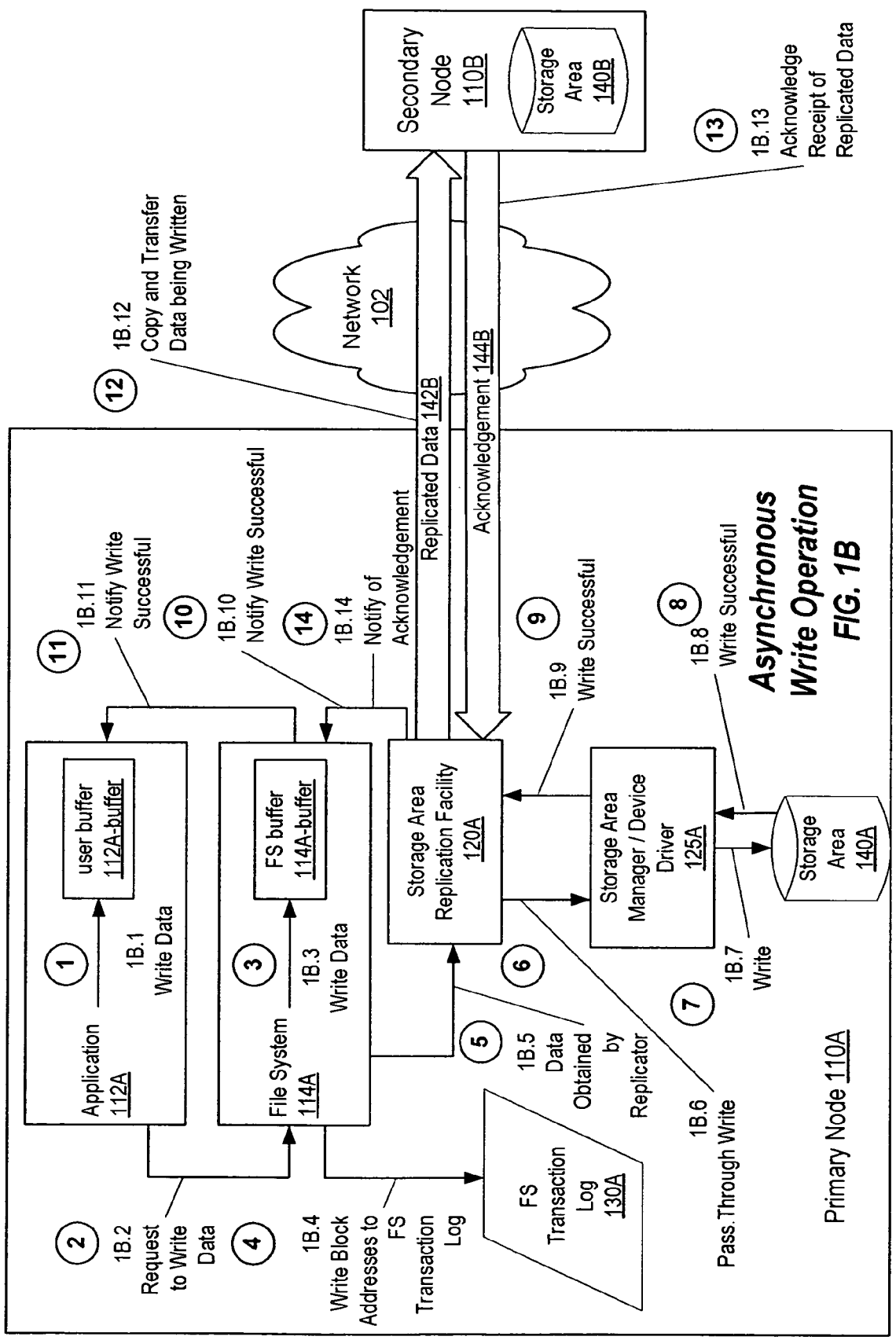

Circular File System Transaction Log

*Dirty Block Structures*

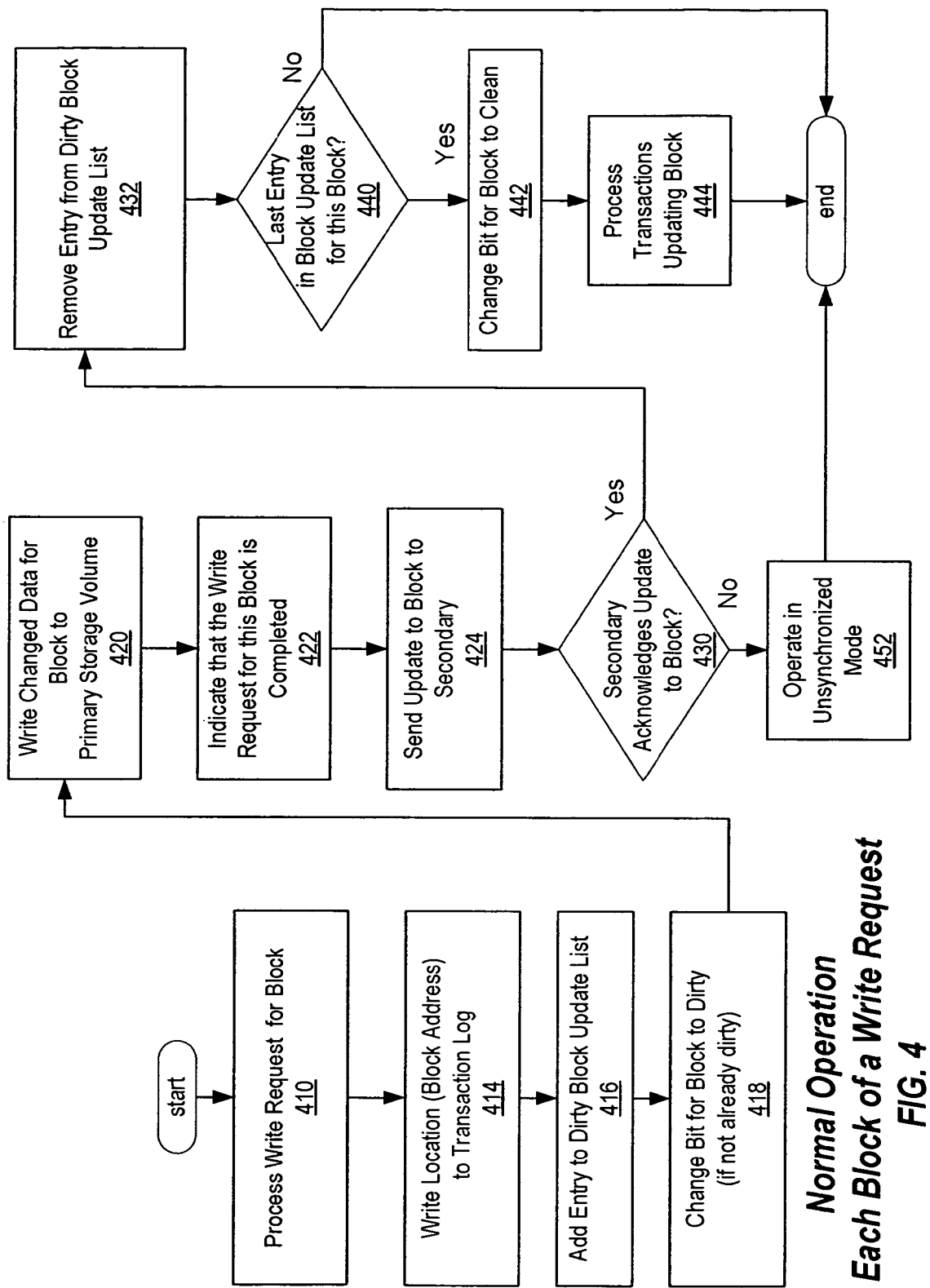

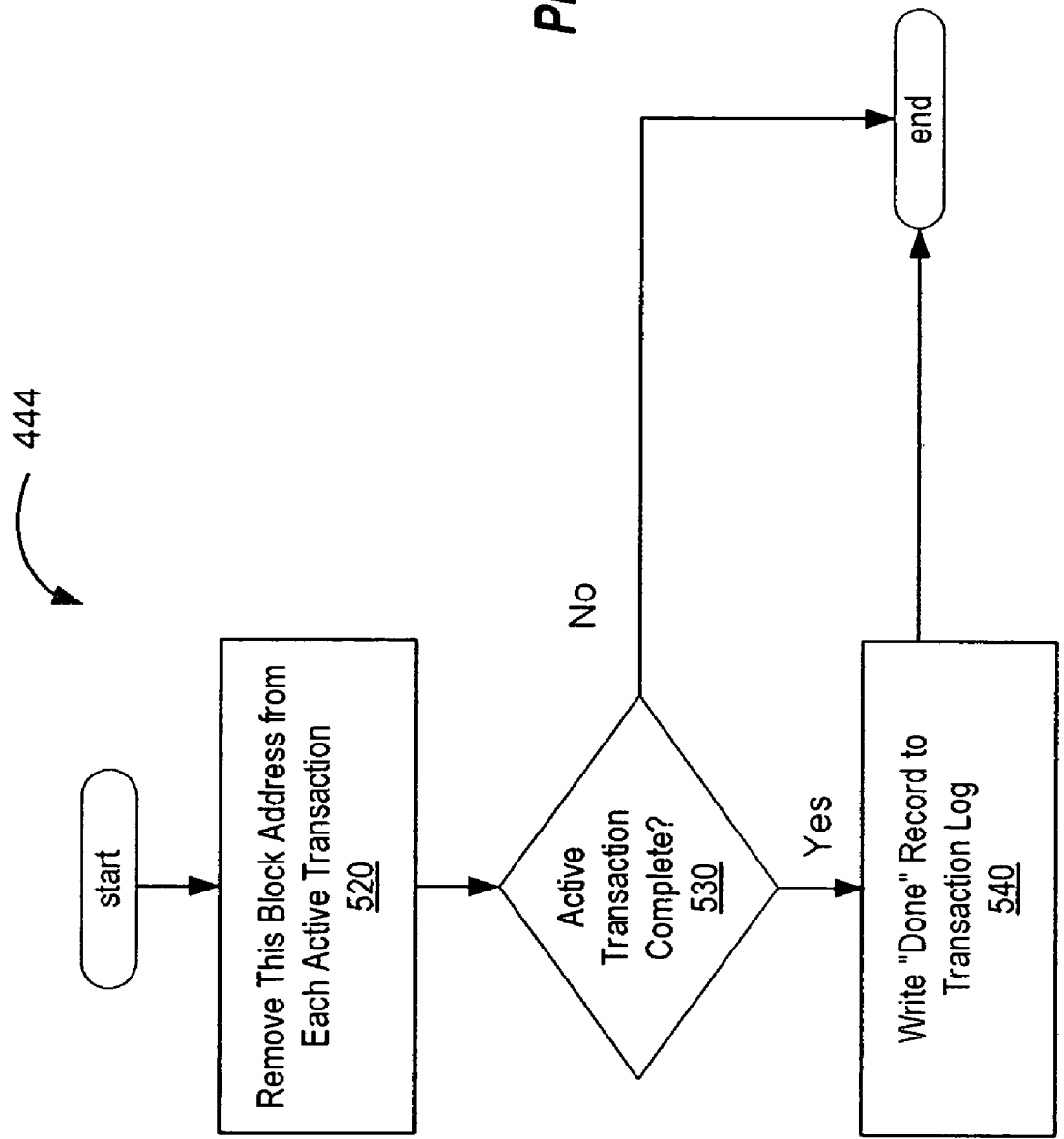

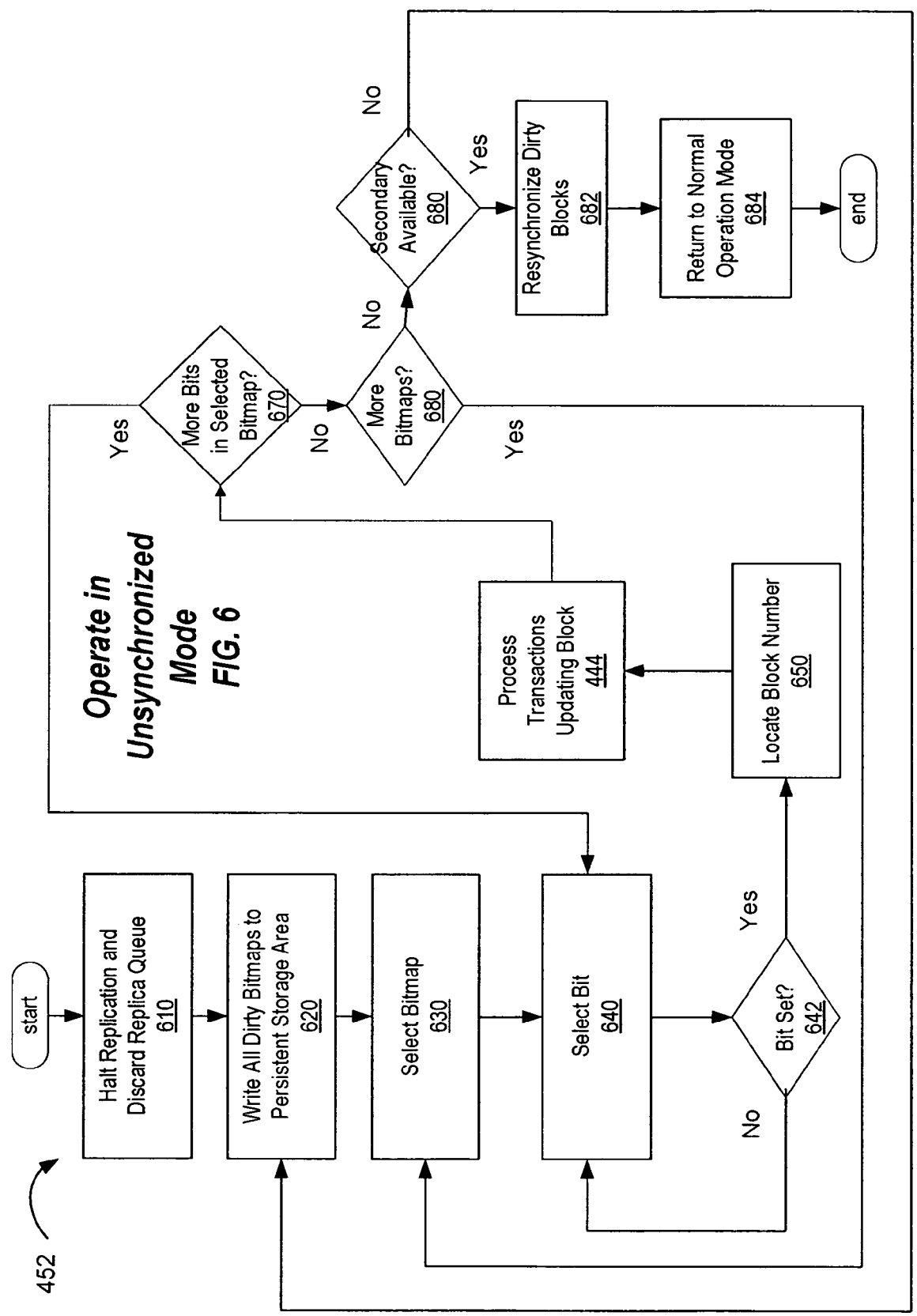

COORDINATED DIRTY BLOCK TRACKING

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Information drives business. A disaster affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from disasters.

Two areas of concern when a failure occurs, as well as during the subsequent recovery, are preventing data loss and maintaining data consistency between primary and secondary storage areas. One strategy includes replicating data from local computer systems to backup local computer systems and/or to computer systems at remote sites.

Storage area replication is used to maintain online duplicate copies of data stored in some storage areas, such as disk volumes. The original storage area is called the primary, and the duplicate is called the replica. Replication tries to ensure that the secondary volume contains the same data, location by location, as in the primary volume, while the primary volume is in active use. Typically application software managing the primary data is a separate product from replication software, referred to herein as a replication facility, and the replication facility "captures" data as the data are being written to a storage device by the application software.

To accommodate the variety of business needs, some replication facilities provide remote mirroring of data and replicating data over a wide area or distributed network such as the Internet. Thus, a primary data server may communicate over a network channel with a replica server. However, different types of storage typically require different replication methods. Replication facilities are available for a variety of storage solutions, such as database replication products and file system replication products, although typically a different replication facility is required for each type of storage solution. Other replication facilities are available for replicating all contents of a particular type of storage device but are not configured to replicate data stored on other types of devices.

Replication can occur simultaneously with performing write operations. Under normal circumstances, updated data, also referred to herein as writes, are sent to the secondary node in the order in which they are produced at the primary node. Consequently, the secondary node represents a state of the primary node at a given point in time. If the secondary node takes over due to a disaster, the data storage areas will be consistent.

A replica that faithfully mirrors the primary currently is said to be synchronized or "in sync." However, problems such as network connectivity failure or host failure may cause the replica data to become unsynchronized, or "out of sync." An out of sync replica may be synchronized by selectively or completely copying data from the primary; this process is called synchronization or resynchronization.

Previously, the problem of synchronization of backup copies of the data at secondary nodes has been solved by restoring the primary data from a "snapshot" copy of the data made before the primary data became unavailable. First, the primary data are restored or a set of secondary data is selected as a new set of primary data with which to continue further processing. Then the entire set of primary data is copied to each backup copy to ensure consistency between the primary data and backup copies. Only then can normal operations, such as updates and replication, of the primary data resume. When terabytes of primary data are involved, the restoration process is lengthy and the downtime to businesses is very expensive.

Ideally, a log containing addresses of changed storage locations (such as blocks of a storage volume) would be maintained, so that recovery processing can use the log to identify the missing data resulting from write operations that were not performed on each secondary node. The log would be used to replicate only the changed storage locations resulting from those write operations to synchronize each backup copy of the primary data. However, logs are typically written to storage devices, which may require a minimum of 512 bytes (the typical size of a location in a storage area) to be written during each write operation. Write operations perform more efficiently when even larger portions of data are written during each write operation. Typically, contents of a given storage location must be read or written as a whole.

Logging is typically performed by the software managing the primary data. Direct logging in a separate log by a replication facility of each data item stored in each location during replication thus wastes resources by duplicating effort already performed by the data management software. Logging by the replication facility imposes excessive overhead and hinders achievement of the goal of synchronized secondary data. As a result, most replication facilities trade granularity for efficiency by using a regional logging technique, sometimes referred to as dirty region logging, where a single region spans many contiguous storage locations. For example, a typical region size is 64 K bytes. If a change occurs to even one storage location in the region, the entire region is marked for replication to secondary nodes. While replication of only dirty regions is an improvement over replication of all data in the storage area, many blocks that are unchanged are nevertheless copied, wasting storage and network resources.

What is needed is the ability to maintain consistent, up-to-date copies of primary data that enable quick resumption of operations upon stopping and restarting the primary node, or upon temporary failures of the network or the secondary node. The solution should allow write operations and replication to be performed efficiently and without copying all primary data to each secondary node when the primary and secondary data need to be synchronized. Furthermore, the solution should allow only storage locations containing data that have changed to be copied to the secondary node, rather than copying an entire region of data when only a selected few blocks within the region have changed.

SUMMARY OF THE INVENTION

The present invention maintains consistent, up-to-date copies of primary data that enable quick resumption of operations upon failure of the primary node, the secondary node, and/or the network connecting the nodes. The current status of individual storage locations is tracked, indicating whether data in each individual storage location is synchronized between a primary node and a secondary node. Transaction logging by a transaction-logging application, such as a file system or database system, is used to track individual storage locations updated with each transaction. Acknowledgements of these updates are tracked during replication to determine whether individual storage locations containing primary and secondary data are synchronized. This coordinated transaction logging and acknowledgement tracking enables write operations and replication to be performed efficiently while maintaining the information necessary to resynchronize only individual storage locations when primary and secondary data become unsynchronized.

BRIEF DESCRIPTION OF THE DRAWINGS

The present invention may be better understood, and its numerous objectives, features, and advantages made apparent to those skilled in the art by referencing the accompanying drawings.

FIG. 1B shows an example of a data flow for performing a write operation in the environment of FIG. 1A.

FIG. 4 is a flowchart of a method for performing dirty block tracking during normal operation, when both the primary and the secondary nodes are operational and replication is in progress, for one block changed in a write request.

FIG. 5 is a flowchart of a method for performing the "Process Transactions Updating Block" step of the flowchart of FIG. 4 in accordance with one embodiment of the invention.

FIG. 6 is a flowchart of the "Operate in Unsynchronized Mode" step of the flowchart of FIG. 4 in accordance with one embodiment of the invention.

The use of the same reference symbols in different drawings indicates similar or items.

DETAILED DESCRIPTION

Figure 1A:
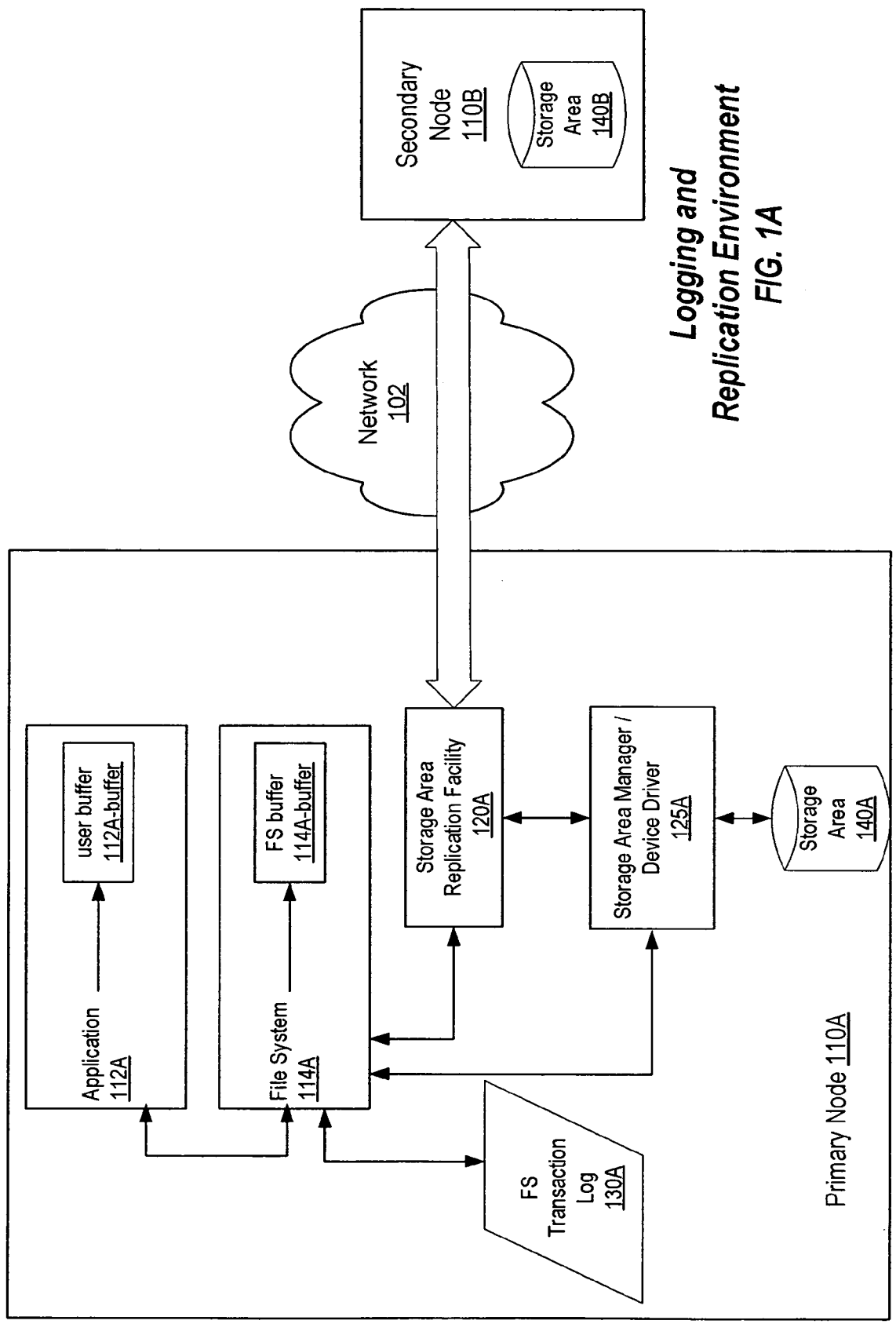
FIG. 1A shows an example of a system for dirty block tracking in a replication environment.

For a thorough understanding of the subject invention, refer to the following Detailed Description, including the appended claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific detail are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Terminology

Data storage may take form as groups of one or more physical devices, such as one or more dynamic or static random access storage devices, one or more magnetic or optical data storage disks, or one or more other types of storage devices. With respect to backup copies of primary data, preferably the backup storage devices are direct access storage devices such as disks rather than sequential access storage devices such as tapes. Because disks are often grouped to form a logical storage volume that is used to store backup copies of primary data, the terms "storage" and "storage area" are used interchangeably herein with "storage volume;" however, one of skill in the art will recognize that the systems and processes described herein are also applicable to other types of storage and that the use of the term "storage volume" is not intended to be limiting.

A storage volume storing the primary data is referred to herein as a primary volume, and a storage volume storing a backup copy of the primary data is referred to herein as a backup volume, secondary volume, or remote volume. A storage volume storing a snapshot of data is referred to herein as a snapshot volume.

Furthermore, the unit of storage in a given storage area is referred to herein as a "location." Again, one of skill in the art will recognize that the unit of storage can vary according to the type of storage area, and may be specified in units of blocks, bytes, ranges of bytes, files, or other types of storage objects. The use of the term "location" herein is not intended to be limiting and is used herein to refer generally to any type of storage object. Most types of storage objects have similar limitations to those described above for blocks, where write operations are more efficient when larger amounts of data are written. A storage area can include multiple storage objects, such as individual locations making up a storage volume disk, with the storage area including multiple storage disks.

The terms "consistent" and "consistency" are used herein to describe a backup copy of primary data that is either an exact copy of the primary data or an accurate representation of the primary data as the primary data existed at a previous point in time. The terms "write operation" and "update operation" are used interchangeably to describe making a change to data. The terms "change" or "update," when used with reference to data, includes adding new data as well as updating or changing existing data.

The terms "host" and "node" are used interchangeably to describe computer systems. Computer systems are known in the art and are not described in detail herein. Computer systems typically include a processor for executing instructions and a memory for storing the instructions. A node in a network managing the primary data/volume is referred to herein as a primary node, and a node in the network maintaining backup copies of the primary data but not the primary data itself is referred to herein as a secondary, backup, replica, or remote node. Secondary performing server functionality may be referred to as secondary servers, backup servers, replica servers, or remote servers.

Software managing primary data may be an application program, a database management system, and/or a file system. Storage area managers and replication facilities may obtain data from any of these software programs, and the term "application" is used generally herein to refer to all of these types of data management software, including databases and file systems.

Secondary nodes may include corresponding copies of applications, including application programs, database systems, and file systems. These respective copies of the application software can perform the functions of a primary node in the event of disaster or failure of the primary node. Alternatively, software and other files associated with the application, database and file system may be stored in a data storage area on the primary node and replicated along with the data. Should the secondary node itself need to manage the data, the programs and other files can be extracted from the replicated data and executed at the secondary node.

Replication of data can be performed synchronously or asynchronously. With synchronous replication, an update is posted to the secondary node and acknowledged to the primary node before completing the update at the primary node. In the event of a disaster at the primary node, data can be recovered from the secondary node without any loss of data because the copies of the data at the primary and secondary nodes contain the same data. With asynchronous replication, updates to data are immediately reflected at the primary node and are queued to be forwarded to each secondary node. Data at the secondary node differs from data at the primary node during the period of time in which a change to the data is being transferred from the primary node to the secondary node, as explained in further detail below. The magnitude of the difference can increase with the transfer time, for example, as update activity increases in intensity. A decision regarding whether to replicate data synchronously or asynchronously depends upon the nature of the application program using the data as well as numerous other factors, such as available bandwidth, network round-trip time, the number of participating servers, and the amount of data to be replicated.

Asynchronously replicating data from a primary volume to a remote volume enables writes to the primary volume to be performed more quickly but increases the gap between the time a block is successfully completed at the primary and the time a copy of the block is written to the replica volume. As a result, asynchronous replication requires additional processing to synchronize primary data and secondary data upon node failure, software failure, or network communications failure.

Introduction

The present invention provides the ability to maintain consistent, up-to-date copies of primary data that enable quick resumption of operations upon failure of the primary node, the secondary node, and/or the network connecting the nodes. Replica resynchronization is an important problem for both replication facilities and storage area managers, which are typically sold as separate products. A storage volume may be used directly as a "raw" device (a device without a software interface for storing data on the storage volume) by certain applications such as databases, but typically a software interface is provided that provides an abstraction of the physical storage locations from the logical organization of the data. For example, many applications store data through a file system (another application) mounted on the raw volume. Write operations are performed by these applications through the file system, and the file system mounted on the storage volume that performs the updates to data may use transactions and transaction logs to track updates to individual storage locations.

In addition, the updated data resulting from the write operation are typically captured by a replication facility and sent to secondary nodes. As noted above, typically a replication facility does not log the data replicated to individual storage locations before sending it to a secondary node for performance reasons. Consequently, the results of write operations may pass through an application, such as a file system or database system, that logs the transaction, as well as through a replication facility. A file system is used as an example of a transaction-logging application herein, although one of skill in the art will recognize that other types of transaction-logging applications can be configured to provide similar functionality to that of the file system described herein.

The present invention takes advantage of this flow of data through both types of systems to capture block-level information that can be used to quickly resynchronize primary and secondary data in individual storage locations. The current status of individual storage locations is tracked, indicating whether data in each individual storage location is synchronized between a primary node and a secondary node. Transaction logging is used to track individual storage locations updated with each transaction. Acknowledgements of these updates are tracked during replication by the replication facility to determine whether individual storage locations containing primary and secondary data are synchronized. This coordinated transaction logging and acknowledgement tracking enables write operations and replication to be performed efficiently while maintaining the information necessary to resynchronize only individual storage locations when primary and secondary data become unsynchronized. By configuring a replication facility and a transaction-logging application to work together, data can be logged for each write operation to each storage location without causing the performance of write operations to suffer. For example, file system logs can be used to store dirty block addresses that can be used later for replica resynchronization when the primary and replica data become unsynchronized.

FIG. 1A shows a detailed view of a system for logging and replicating data via a network 102. Data are replicated from primary node 110A to secondary node 110B, each of which can be implemented as computer systems as are known in the art. Such computer systems may be implemented as computer systems including a processor (not shown) for executing instructions and a memory (not shown) for storing the instructions, as an integrated circuit (e.g., an FPGA (Field Programmable Gate Array) or ASIC (Application Specific Integrated Circuit) configured to perform the functionality of such instructions, or as a mechanical device configured to perform such functions, such as a network appliance. One of skill in the art will understand that replication can be performed to multiple secondary nodes, although only a single secondary node is shown herein for purposes of simplicity. Replication to multiple secondary nodes is within the scope of the invention.

Primary node 110A includes an application program 112A. Application program 112A can be, for example, a database or a user-level application program. Application 112A generates data to be written to a permanent storage device and includes a user buffer 112A-buffer into which data are written prior to being written to a permanent storage device. The present invention operates independently of the type of data and/or unit of storage of the data. Application program 112A is shown as communicating with a file system 114A, which also includes a buffer, FS buffer 114A-buffer, into which data are written prior to being written to a permanent storage device. Application 112A is not essential to operation of the invention, as file system 114A can initiate writing data to a permanent storage device; however, if application program 112A is present, application program 112A communicates with the permanent storage device through file system 114A. Whether or not file system 114A generates the data to be written initially, file system 114A may generate updates for its own internal data (metadata) for files maintained by file system 114A.

File system 114A is shown as communicating with a storage area replication facility 120A and maintaining a file system transaction log 130A. Storage area replication facility 120A lies between file system 114A and storage area manager/device driver 125A, which provides a software interface to storage area 140A. Storage area replication facility 120A can receive numerous concurrent file system write requests to storage area 140A from file system 114A, including both application-generated data and file system metadata, as described above. Storage area replication facility 120A stores the data in storage area 140A via storage area manager/device driver 125A, which communicates directly with storage hardware for storage area 140A. Storage area manager/device driver 125A can be implemented as a storage area manager, such as Veritas Software Corporation's Veritas Volume Manager, or as a device driver configured to communicate with a particular device (here represented by storage area 140A). It is within the scope of the invention that storage area 140A can include multiple storage objects, such as individual blocks making up a storage volume disk.

Storage replication logs (not shown) may also be used on primary node 110A for separately tracking data replicated to secondary node 110A. Secondary node 110B can also include a corresponding copy (not shown) of application 115A. The copy of application 115A can perform the functions of primary node 110A in the event of disaster, although an application program need not be executing for performing replication or synchronization in accordance with the present invention. Alternatively, programs and other files associated with application 115A may be stored in a data storage area on the primary node and replicated along with the data. Should the secondary node itself need to manage the data, the programs and other files can be extracted from the replicated data and executed at the secondary node.

Corresponding copies (not shown) of file system 114A, storage area replication facility 120A and storage area manager/device driver 125A may also reside on secondary node 110B. These copies enable secondary node 110B to perform functions similar to those performed at primary node 110A and to manage storage areas and replicate data to other secondary nodes if necessary.

Shown in FIG. 1B are actions for an asynchronous write operation performed in the environment of FIG. 1A. Action numbers for actions described in the Figures are provided as encircled text for the reader's convenience. Assume that data in storage area 140A on node 110A and storage area 140B on node 110B are initially synchronized. In action 1B.1, application 112A generates data to be written and stores the data in an in-memory user buffer 112A-buffer. In action 1B.2, application 112A requests file system 114A to write the data to a permanent storage device. Upon receiving the data, in action 1B.3, file system 114A writes the data to a respective file system buffer, FS buffer 114A-buffer.

In action 1B.4, file system 114A writes the block addresses indicated in the write request to file system transaction log 130A. File system transaction log 130A is maintained in memory allocated for user by file system 114A until a communication problem arises between primary node 110A and 110B due to failure of one of the nodes or of a communication link between the nodes. In action 1B.5, storage area replication facility 120A obtains the data written to FS buffer 114A-buffer in action 1B.3 on its way to storage area manager/device driver 125A. The data may be provided by file system 114A to storage area replication facility 120A directly, the data may be intercepted by storage area replication facility 120A on its way from file system 114A to storage area manager/device driver 125A, or the data may be written by file system 114A into another storage area (not shown), such as a write queue, from which storage area replication facility 120A retrieves the data for writing to storage area 140A.

In action 1B.6, storage area replication facility 120A passes the data to be written to storage area 140A to storage area manager/device driver 125A. In action 1B.7, storage area manager/device driver 125A writes the data to storage area 140A. Now that the data are persistently stored on disk, the transaction is complete with respect to primary node 110A. In action 1B.9, storage area manager/device driver 120A notifies storage area replication facility 120A that the write operation is successful. At this point, the storage area replication facility 120A notifies file system 114A that the write was successful, as shown in action 1B.10. In action 1B.11, file system 114A notifies application 112A that the write request was successful.

In action 1B.12, storage area replication facility 120A copies the data written, referred to as replicated data 142B, and initiates a transfer of replicated data 142B to secondary node 110B to be stored in storage area 140B. Storage area replication facility 120A may write the data to a replication queue, from which storage area replication facility 120A retrieves data to be replicated to secondary node 110B.

In action 1B.13, secondary node 110B sends acknowledgement 144B to acknowledge receipt of replicated data 142B. Upon receiving replicated data 142B and writing the data to a persistent data storage area, such as storage area 140B, storage area replication facility 120A notifies files system 114A that the acknowledgement was received in action 1B.14. One of skill in the art will recognize that actions 1B.10, notifying file system 114A that the write request was completed successfully, and 1B.12, copying and transferring the data to secondary node 110B, may occur in parallel.

Storage area replication facility 120A ensures that each update to data is performed on the replica in storage area 140B in the same order that the update was performed to data in the local storage area, storage area 140A. Proper ordering of write operations ensures that the replica image is a consistent representation of the state of the data in the local storage area 140A; i.e., the replica image is either an exact copy of the primary data or an accurate representation of the primary data as the primary data existed at a previous point in time. This property is called "write order fidelity."

Asynchronous replication hides the latency of updating the replica from the file system but introduces a new problem. If primary node 110A fails, all the writes that were in queue for replication are lost, and the replica is said to be unsynchronized. If the system is to resume operation after the primary node is restarted, the replica must be resynchronized by reading the data from primary storage 140A and writing the data to the secondary storage area 140B. The activity of updating the replica to make its contents effectively identical to the primary data is called replica synchronization (when initializing a new replica) or resynchronization (when the replica comes unsynchronized due to failures). Resynchronization is most efficient if it copies across only those blocks that really need to be copied; for example, preferably only those blocks containing data still in the replica queue that have not yet been replicated are copied. However, such resynchronization requires logging dirty block addresses that were updated to local disk, and logically removing the entries from the log when those blocks have been copied to the replica. Logging block addresses is an expensive activity for a volume replicator, and is generally not implemented.

Transaction Log Structure

Figure 2:
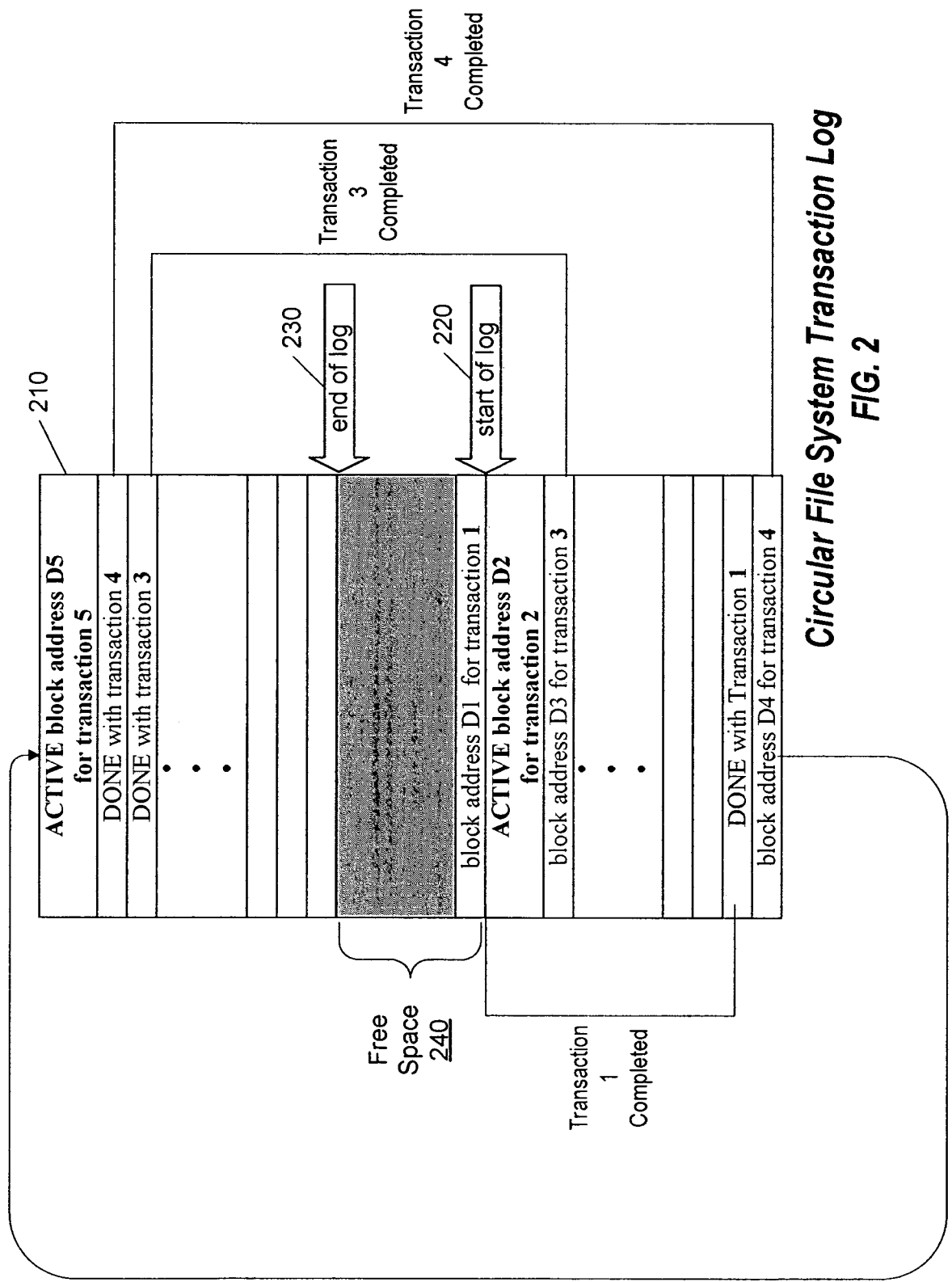
FIG. 2 shows an example of a file system transaction log that can be used to implement the present invention.

FIG. 2 is an example of one embodiment of a file system transaction log used by the present invention. FIG. 2 is discussed with reference to the system components of FIG. 1. File system transaction log 210 is a log of updates to data on the primary node 110A that is used to update data in a storage device, such as storage area 140A. One of skill in the art will recognize that file system transaction log 210 is an example of a transaction log used by any type of transaction-logging application. In the embodiment shown in FIG. 2, file system transaction log 210 is implemented as a circular buffer by file system 114A and is typically stored in persistent data storage. One of skill in the art will recognize that many data structures may be maintained in memory with regard to a particular transaction, and that a "transaction record" for a transaction in file system transaction log 210 may have a variety of associated in-memory data structures.

FIG. 2 shows file system transaction log 210 as containing records for five transactions, labeled transactions 1 through 5. File system transaction log 210 is a circular buffer, beginning at the location labeled by 'start of log' pointer 220 and ending at the location labeled by 'end of log' pointer 230. File system transaction log 210 may be implemented, for example, as a set of contiguous storage locations at the beginning of a logical volume storing data for a file system, such as file system 114A. Records for transaction 1 begin at the location immediately prior to 'start of log' pointer 220, where a block address D1 is recorded as being affected by transaction 1. The next record for transaction 1 is next to the bottom of transaction log 210, indicating "DONE with transaction 1." This DONE record indicates that transaction 1 is now complete. Transactions 1, 3, and 4 are labeled as "completed," and each is shown with a corresponding "DONE" record written to the transaction log after the initial record for the transaction that contains the block address affected by the transaction.

In FIG. 2, 'start of log' pointer 220 points to the first record for transaction 2. 'Start of log' pointer 220 initially points to the location in file system transaction log 210 containing the next active transaction that will be written to the storage device. An active transaction is a transaction for which a corresponding "DONE" record has not yet been written to file system transaction log 210. After the transaction is completed, the 'start of log' pointer 220 is moved to point to the next active transaction, which, in the example shown in FIG. 2, is transaction 5 at the top of file system transaction log 210. Until a "DONE" record is written to file system transaction log 210 for transaction 2, 'start of log' pointer 220 will remain pointing to the initial record for transaction 2.

'End of log' pointer 230 points to the location in file system transaction log 210 to which the next transaction, transaction 6 (not shown), will be logged. The log locations between 'end of log' pointer 230 and 'start of log' pointer 220 are free space 240. 'End of log' pointer 230 points to the first location in free space 240. When transaction 1 was completed, 'start of log' pointer 220 was incremented (not shown) to point to the location containing the update resulting from transaction 2. The location formerly containing the initial record for transaction 1 became a part of free space 240 and can be overwritten by subsequent transactions. As each update resulting from each transaction is completed, the respective update location in file system transaction log 210 is "cleared" so that the respective location in file system transaction log 210 can be returned to the free space and reused.

With a circular file system transaction log such as file system transaction log 210, it is possible that the log becomes full, such that the 'end of log' pointer 230 points to the same location as 'start of log' pointer 220, and no free space 240 is available. In such a case, new transactions can proceed only when the earlier transactions are completed. In the example shown, the log could become full (i.e., free space 240 would be used) while the 'start of log' pointer 220 continues to point to transaction 2, and further transactions would be prevented. Such a situation might occur if the replica server becomes inaccessible for more than a few seconds and cannot acknowledge receipt of replicated data, thereby bringing the file system to a halt. An alternative data structure is used to record the updated "dirty" blocks so that the log entries can be discarded and transactions can continue, without losing the dirty block addresses that were previously recorded in file system transaction log 210. These data structures are discussed in further detail with reference to FIG. 3.

In one embodiment, dirty block tracking information is not written to a persistent storage area until a failure is detected and file system transaction log 210 is to be read and used to recover from the failure. Examples of such failures include failure of primary node 110A, secondary node 110B, or communication between primary node 110A and secondary node 110B, represented in FIG. 1A by network 102. During normal processing, file system transaction log 210 is maintained on disk, along with other data structures maintained in memory of file system 114A (along with FS buffer 114A-buffer), and transactions are written to file system transaction log 210 on disk when started and cleared from file system transaction log 210 when completed.

Referring again to FIG. 1A, file system 114A initiates all updates that are received by storage area replication facility 120A, so file system 114A is in a good position to keep track of blocks being updated, or "dirtied," by a given transaction. It is assumed that file system 114A tracks updates in a file system transaction log, such as that described with reference to FIG. 2, and that it is possible to enhance the file system 114A transaction/logging mechanism to perform the functions described herein.

Figure 3:
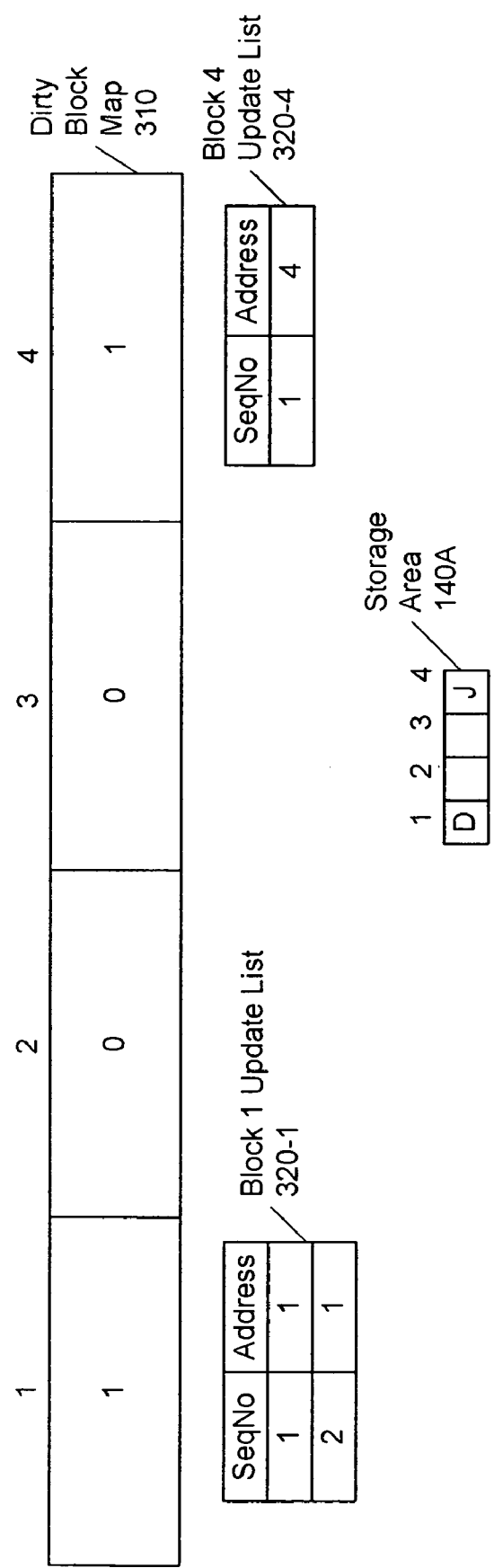
FIG. 3 shows dirty block data structures for performing dirty block tracking in accordance with one embodiment of the invention.

FIG. 3 shows dirty block data structures for performing dirty block tracking in accordance with one embodiment of the invention. As described above, file system 114A writes a new type of transaction record, a dirty block record, to file system transaction log 210 at the time of writing new data to, also referred to as "dirtying," the block buffers (such as file system buffer 114A_buffer of FIGS. 1A and 1B).

The data structures used in association with the new dirty block record include a dirty block map 310 having one entry for each block (with entries for blocks 1–4 shown in FIG. 3). Dirty block map 310 can represented as a bitmap. Each bit in dirty block map 310 is set when a write operation occurs to the corresponding block, under control of a transaction updating the file system transaction log. Each bit represents whether the given block on the primary node is unsynchronized with corresponding blocks on the secondary nodes to which the data are being replicated. In the example shown, the bit for block 1 is "dirty," having a value of one, which indicates that the data in block 1 have been updated but the write operation has not yet been replicated to all secondary nodes. When all bits have a value of zero, the blocks are synchronized between the primary and secondary nodes.

One of skill in the art will recognize that it is not required that dirty block map 310 be implemented as a bitmap, as long as the blocks that are updated ("dirty") are tracked. For example, the dirty block map may be implemented as a table or other data structure, and the invention is not limited to any particular type of implementation. A dirty block bitmap provides an advantage in that a bitmap can be manipulated efficiently, and a dirty block bitmap is used as an example herein. Logically, a single dirty block map, such as dirty block map 310, contains one bit (or other indicator) for each block in the entire storage area. However, the actual dirty block map can be implemented as multiple dirty block map structures, each containing a small number of bits, with each bit corresponding to a small contiguous region in the storage area.

Asynchronous replication complicates the implementation of dirty block maps, such as dirty block map 310, due to the need to maintain write order fidelity. Although a file system caches data blocks and also delays writes to a local storage area as much as possible, it is possible to have a situation where a block with contents d1 is still on the replica queue awaiting replication to a secondary node, but the file system has updated the contents to d2 during another write operation on the block. As described with reference to FIG. 1B, a block is copied into a private buffer, such as FS 114A_buffer, and placed on the replica queue, allowing the file system to update the block asynchronously, even after the file system I/O request is completed. Since a single bit of the bitmap cannot keep track of multiple acknowledgements, the in-memory file system data structures are enhanced to track multiple outstanding replica updates on the same block.

To solve this problem, the data structures for dirty block tracking in FIG. 3 also include a block update list for each block, such as block 1 update list 320-1 and block 4 update list 320-4. Because a single bit for each block cannot represent whether each update to a given block has been acknowledged when multiple updates to that given block occur, block 1 update list 320-1 and block 4 update list 320-4 track multiple updates to a given block. In the example, each block update list includes a sequence number, also referred to as an update identifier, which is generated by storage area replication facility 120A, and a location, e.g., an address for the block. For example, block 1 update list 320-1 for block 1 has two entries, the first with a sequence number of '1' and a location of '1' (for block 1), and the second with a sequence number of '3' and a location of '1' (for block 1). Block 4 update list 320-4 has one entry, having a sequence number of '1' and a location of '4' for block 4. The sequence numbers are used to identify the update that is being acknowledged when an acknowledgement arrives. In one embodiment, block 1 update list 320-1 and block 4 update list 320-4 are implemented as a single hash table for efficiency purposes, although other implementations, such as the two block update lists in FIG. 3, are within the scope of the invention. FIG. 3 also shows data in storage area 140A for which dirty block map 310 is being maintained. Block 1 of storage area 140A contains a value of 'D,' and block 4 contains a value of 'J.'

Dirty block map 310 can be held in memory for as long as possible. Bits in dirty block map 310 normally will be set and reset fairly quickly, so that dirty block map 310 may not need to be stored persistently. However, if the replica server, such as secondary node 110B of FIG. 1A, becomes inaccessible, such that primary node 110A and secondary node 110B are no longer synchronized, dirty block map 310 should be maintained in persistent data storage. While writing dirty block map 310 to persistent data storage may degrade performance slightly, the degradation occurs only during abnormal conditions when the primary and secondary nodes 110A and 110B are unsynchronized. Operating in unsynchronized mode is described in further detail below with reference to FIG. 6.

If a set of write operations involves a transaction that is already being written to the file system transaction log (such as a metadata update being written to file system transaction log 130A of FIG. 1A), the dirty block record can be written to the file system transaction log along with the existing transaction. However, write operations updating data in a file may not generate a transaction (e.g., for delayed writes), so those write operations may incur the overhead of creating a transaction for adding a dirty block record to the file system transaction log. Depending upon the implementation of the file system transaction log, it may be possible to distribute the cost of the transaction over multiple write operations to decrease overhead.

FIG. 4 is a flowchart of a method for performing dirty block tracking during normal operation, when both the primary and the secondary nodes are operational and replication is in progress, for one block changed in a write request. While a single write request typically changes data in more than one block, each of the multiple blocks will be processed in accordance with the method of FIG. 4. Steps in the flowchart are described herein with reference to the environment of FIGS. 1A and 1B and the dirty block structures of FIG. 3. In the method of FIG. 4, assume that a write request to update block 1 of storage volume 140A has been generated by application 112A and passed to file system 114A.

In "Process Write Request for Block" step 410, file system 114A processes a write request to change data in a block, here block 1 of storage volume 140A, from application 112A. Such a write request may be generated by application 112A and sent to file system 114A, or file system 114A itself may generate the write request. Upon receiving or generating the write request, file system 114A allocates a buffer, such as FS buffer 114A-buffer, for each block to be updated. When buffer FS buffer 114A-buffer is allocated, file system 114A writes the new data value for each block into the respective buffer for that block, here FS buffer 114A-buffer for block 1. FS buffer 114A-buffer is now dirty, and it is desirable to track the fact that the data have been changed to be used in the event of failure of secondary node 10B, failure of network 102, or stopping and restarting primary node 110A. In one embodiment, FS buffer 114A-buffer is passed from file system 114A to storage area replication facility 120A. Control then proceeds to "Write Block Address to Transaction Log" step 414.

In "Write Block Address to Transaction Log" step 414, file system 114A adds a log record to FS transaction log 130A. This log record may have a format such as that shown in FIG. 2, with each record indicating a block address and a transaction identifier for one block updated in a given transaction. Control then proceeds to "Add Entry to Dirty Block Update List" step 416.

In "Add Entry to Dirty Block Update List" step 416, an entry is added to the dirty block update list for block 1, such as dirty block update list 320-1 of FIG. 3. In one embodiment, this entry is added by storage area replication facility 120A. In another embodiment, storage area replication facility 120A uses a callback function, referred to herein as the INSERT callback function, to request file system 114A to add the entry to the dirty block update list 320-1. A callback function is a function that will be executed by file system 114A, but that can be called by storage area replication facility 120A. File system 114A may provide, for example, the name of the INSERT callback function to storage area replication facility 120A upon initialization. Storage area replication facility 120A can then call the function by the name provided and request that the entry be added to block 1 update list 320-1.

In one embodiment, storage area replication facility 120A generates a sequence number, also referred to as an update identifier, to uniquely identify the update for the block and provides the sequence number and the block address to file system 114A for entry into dirty block update list 320-1. In response to receiving the call to the INSERT function, file system 114A inserts the entry into the appropriate dirty block update list 320-1. Control then proceeds to "Change Bit for Block to Dirty (if not already dirty)" step 418.

In "Change Bit for Block to Dirty (if not already dirty)" step 418, an entry in a dirty block map, such as dirty block map 310, is changed for block 1. If the bit is clean (has a value of zero), the value of the bit is changed to one. If the bit is already dirty (has a value of one), the bit remains set as dirty. At this point, the dirty block map structures for block 1, such as dirty block map 310 and block update list 320-1, have been updated to indicate that the value of the data for block 1 has changed. In one embodiment, file system 114A changes entries in dirty block map 310. Control then proceeds to "Write Changed Data for Block to Primary Storage Volume" step 420.

In "Write Changed Data for Block to Primary Storage Volume" step 420, file system 114A and storage area replication facility 120A interact to ensure that the changed data are written to primary storage area 140A. For example, in one embodiment, file system 141A passes control of FS buffer 114A-buffer, the buffer for block 1, to storage area replication facility 120A. File system 114A cannot write another value to FS buffer 114A-buffer until storage area replication facility 120A frees FS buffer 114A-buffer. Preventing another write operation to block 1 before the value of FS buffer 114A-buffer is stored in a persistent storage area, such as block 1 of storage area 140A, ensures that the transactions on primary node 110A are performed in the same order on secondary node 110B to maintain write order fidelity.

Storage area replication facility 120A passes FS buffer 114A-buffer to storage area manager/device driver 125A, which writes the contents of FS buffer 114A-buffer to block 1 of storage area 140A. Storage area 140A returns a successful status to storage area manager/device driver 125A, and storage area manager/device driver 125A returns a successful status to storage area replication facility 120A. When storage area replication facility 120A receives notification that the write operation to the primary storage volume 140A was successful, storage area replication facility 120A places the contents of FS buffer 114A-buffer into a queue for replication to secondary node 110B. Control then proceeds to "Indicate that the Write Request for this Block is Completed" step 422.

In "Indicate that the Write Request for this Block is Completed" step 422, storage area replication facility 120A indicates to file system 114A that the write request for this block has been written to a persistent storage area, such as storage area 140A. In one embodiment, storage area replication facility 120A returns FS buffer 114A-buffer to file system 114A, with a status indicating that the write request was successful.

With file system 114A having control of FS buffer 114A-buffer again, file system 114A can issue a new write request and begin processing again "Process Write Request for Block" step 410. This process proceeds in parallel with replication of the data to secondary node 110B. From "Indicate that the Write Request for this Block is Completed" step 422, control proceeds to "Send Update to Block to Secondary" step 424. Storage area replication facility 120A sends the update to the block to secondary node 110B via network 102 and awaits acknowledgement of the update, as shown in "Secondary Acknowledges Update to Block" decision point 430.

At "Secondary Acknowledges Update to Block" decision point 430, assume that secondary node 110B writes the data to persistent data storage and acknowledges the update. When storage area replication facility 120A receives an acknowledgement from secondary node 110B that an update to a block has been received, storage area replication facility 120A identifies the block. For example, storage area replication facility 120A may identify the sequence number assigned to the block update, as described with reference to "Add Entry to Dirty Block Update List" step 416 above. Now that the update has been acknowledged, control proceeds to "Remove Entry from Dirty Block Update List" step 432.

In "Remove Entry from Dirty Block Update List" step 432, storage area replication facility 120A ensures that the update is removed from the dirty block update list. In one embodiment, storage area replication facility 120A itself removes the entry from the dirty block update list. In another embodiment, storage area replication facility 120A calls a DELETE callback function to request file system 114A to delete the update from the dirty block update list. Storage area replication facility 120A provides the block identifier and sequence number to file system 114A. In response to receiving the call to the DELETE function, file system 114A deletes the entry from dirty block update list 320-1. The DELETE callback function deletes the entry that was added by the INSERT callback function because the secondary node 110B is now synchronized with respect to that update. Control then proceeds to "Last Entry in Block Update List for this Block" decision point 440.

In "Last Entry in Block Update List for this Block" decision point 440, a determination is made whether the block update list for this block is now empty. If not, processing of the write request for this block is completed, although outstanding write requests for the block remain and the bit in the dirty block map 310 for this block remains set. If the last entry in the block update list for the block was deleted, control proceeds to "Change Bit for Block to Clean" step 442 to reset the bit in dirty block map 310 for this block. In the embodiment where storage area replication facility 120A maintains the dirty block update lists, storage area replication facility 120A calls a RESET callback function of file system 114A to reset the bit. In the embodiment where storage area replication facility 120A calls the DELETE callback function, file system 114A resets the bit as part of the processing performed when the block update list is updated.

When processing of a given update transaction for a block is performed, in addition to updating the dirty block update list for that block, other data in file system transaction log 130 can also be changed to indicate that this particular update is completed. Control proceeds to "Process Transactions Updating Block" step 444. "Process Transaction Updating Block" step 444 is described in further detail with reference to FIG. 5 below.

FIG. 5 is a flowchart of a method for performing the "Process Transactions Updating Block" step of the flowchart of FIG. 4 in accordance with one embodiment of the invention. In "Remove this Block Address from Each Active Transaction" step 520, each active transaction in file system transaction log 130 is identified, and references to the block address for the current write request are removed. Control then proceeds to "Active Transaction Complete" decision point 530. If the transaction is complete, other transaction log data should indicate that the transaction is complete and no block addresses should remain in file system transaction log 130A for the transaction. If the transaction is complete, control proceeds to "Write 'Done' Record to Transaction Log" step 540, where a record is written to file system transaction log 130A to indicate that the transaction is complete. When a 'done' record is written to file system transaction log 130A, file system 114A frees space allocated in file system transaction log 130A; for example, the space previously used by this transaction can be added to free space 240 of FIG. 2. This transaction no longer prevents the log from wrapping around.

When the update for a given block has been removed from the respective dirty block update list, here dirty block update list 320-1, and the file system transaction log, here file system transaction log 130A, the dirty block data structures no longer show that the update is outstanding. In this example, the bit for block 1 in dirty block map 310 is reset to zero. All data structures related to the transaction in memory for file system 114A are released, and the file system buffer, here FS buffer 114A-buffer, no longer contains data for block 1. Finally, neither storage area replication facility 120A nor secondary node 110B retains data structures in memory related to the update to block 1.

The data structures for dirty block tracking appear as described above when an acknowledgement of a given update is received at "Secondary Acknowledges Update to Block" decision point 430 of FIG. 4. When an acknowledgement for a given update is not received, the entry for that update remains in the dirty block update list for the block. Referring back to "Last Entry in Block Update List for this Block" decision point 440, no determination can be made that the block update list for this block is empty. Control cannot proceed to "Change Bit for Block to Clean" step 442 to reset the bit for this block, other data in the file system transaction log cannot be changed to indicate that this particular update is completed, and control cannot proceed to "Process Transactions Updating Block" step 444. As a result, transactions involving this block cannot be completed, and the file system transaction log can become full or other resources may become unavailable.

When no acknowledgement of an update is received, file system 114A can detect that the log is full, file system 114A or storage area replication facility 120A may detect that other resources are unavailable, or storage area replication facility 120A may determine that a time limit for the acknowledgement has been exceeded. These events are examples of events that can cause a determination to be made in "Secondary Acknowledges Update to Block" decision point 430 of FIG. 4 that no acknowledgement has been (or will be) made. Control then proceeds to "Operate in Unsynchronized Mode" step 452 of FIG. 4, which is described in further detail with reference to FIG. 6.

FIG. 6 describes "Operate in Unsynchronized Mode" step 452 of FIG. 4 in further detail. In unsynchronized mode, processing continues normally on primary node 110A but replication to secondary node 110B is halted. A resynchronization process is needed before normal operations and replication between primary and secondary nodes 110B can resume. In "Halt Replication and Discard Replica Queue" step 610, storage area replication facility 120A halts replication and discards the replica queue for secondary node 110B. The replica queue contains updates that have been made to storage area 140A on primary node 110A, but that have not yet been replicated to secondary node 110B. These updates are represented by the dirty bits set in the in-memory dirty bit map 310. Control proceeds to "Write All Dirty Bitmaps to Persistent Storage Area" step 620.

In "Write All Dirty Bitmaps to Persistent Storage Area" step 620, each dirty bitmap containing a dirty bit is written from file system transaction log 130A in file system 114A memory to a persistent storage area. Control then proceeds to "Select Bitmap" step 630, where file system 114A begins to traverse the dirty block bitmap(s) in search of dirty bits. Control proceeds to "Select Bit" step 640 to select a bit of the selected bitmap. Control proceeds to "Bit Set" decision point 642, where a determination is made whether the selected bit is set. If not, control returns to "Select Bit" step 640 to select another bit. If the selected bit is set, control proceeds to "Locate Block Number" step 650.

In "Locate Block Number" step 650, the block number for the selected bit is determined, and control proceeds to "Process Transactions Updating Block" step 444. Recall that "Process Transactions Updating Block" step 444 was described in further detail with reference to FIG. 5. In "Process Transactions Updating Block" step 444, the current block address was removed from each active transaction in the file system transaction log, a determination was made whether each active transaction had completed, and if so, a 'done' record was written to the file system transaction log for that active transaction. This processing is repeated while operating in unsynchronized mode to complete transactions, thereby clearing records from the file system transaction log and adding the memory previously used for the completed transactions to free space, such as free space 240 of FIG. 2.

Referring again to FIG. 6, from "Process Transactions Updating Block" step 444, control proceeds to "More Bits in Selected Bitmap" decision point 670. If bits remain in the selected bitmap, control returns to "Select Bit" step 640 to select and process another bit. If no bits remain, control proceeds to "More Bitmaps" decision point 680. If additional bitmaps remain to be processed, control returns to "Select Bitmap" step 630 to select and process another bitmap. If no bitmaps remain, control proceeds to "Secondary Available" decision point 680.

At "Secondary Available" decision point 680, a determination is made whether secondary node 110B is now available so that it can be resynchronized with primary node 110A and normal operations resumed. If secondary 110B is unavailable, control returns to "Write All Dirty Bitmaps to Persistent Storage Area" step 620 to write the current state of the dirty block bitmaps to persistent storage area again and process the write requests that have occurred on primary node 110A while the file system transaction log was being updated. If secondary node 110B is now available, control proceeds to "Resynchronize Dirty Blocks" step 682.

In "Resynchronize Dirty Blocks" step 682, primary and secondary nodes 110A and 110B have been operating in unsynchronized mode. Because replication is halted in unsynchronized mode, some updates have been written to primary node 110A but have not been replicated to secondary node 110B. unsynchronized data between primary node 110A and secondary node 110B can be identified using the dirty bits remaining in the in-memory dirty block map 310 used for transactions not yet replicated, along with the dirty bits in the dirty block bitmaps written to the persistent storage area. The data in the unsynchronized blocks can be copied from primary node 110A to secondary node 110B, and normal operation can then resume, as shown in "Return to Normal Operation Mode" step 684. Replication may be blocked until resynchronization is complete, or file system 114A may inform storage area replication facility 120A when resynchronization is complete.

Note that the nodes can be synchronized without copying all of the data from primary node 110A to secondary node 10B, and even without copying all data in a given region from primary node 110A to secondary node 110B. Only blocks identified in dirty block map 310 need be copied to synchronize the primary and secondary nodes 110A and 110B.

In the embodiments described above, bits in the dirty block map are marked dirty by the file system, such as file system 114A of FIGS. 1A and 1B, upon performing a write operation. However, the bits are identified for being marked clean by the storage area replication facility, such as storage area replication facility 120A of FIGS. 1A and 1B. When an acknowledgement is received for a certain block from the replica server, the storage area replication facility 120a calls back into file system 114A to clear the corresponding dirty block bit.

Normally, the file system marks a transaction as complete when all associated in-memory dirty block structures have been written to a persistent storage area. This mechanism can be optimized for dirty block maps. A dirty block map structure on disk will have all bits reset when the replica is synchronized with the primary data and asynchronous replication is enabled. Values in the dirty block map structure will typically transition from all bits zero to some bits being turned on (due to updates), and finally these bits being turned off (due to replica update completion events). Even though the dirty block map has undergone changes, and is technically dirty, in reality the dirty block map reflects the state of the data stored on disk. As a result, there is no need to write the dirty block map to a persistent storage area, and the dirty block map can be marked clean in memory.

Quick resynchronization is performed when a primary node, such as primary node 110A, fails and is restarted as the primary node (when failover to a secondary node, such as secondary node 110B, did not occur). At the time file system 114A is mounted after the restart, file system 114A will detect that dirty block logging is enabled. File system 114A then traverses the dirty block map, such as dirty block map 310, and compels storage area replication facility 120A to copy the blocks marked as 'dirty' to the secondary node 110B.

In one embodiment, resynchronization can be performed using a 'copy on read' facility. This technique for performing replica synchronization is described in U.S. patent application Ser. No. 10/457,670, entitled "Replica Synchronization Using Copy-on-Read Technique," filed Jun. 9, 2003, and naming as inventors Dilip M. Ranade and Radha Shelat, the application being incorporated by reference herein in its entirety for all purposes.

If the 'copy on read' feature described in the above-mentioned patent application is available, the file system places storage area replication facility 120A into copy-on-read mode and reads the affected (dirty) blocks. If the 'copy on read' feature is unavailable, storage area replication facility 120A may read and write the blocks to and from a local storage area, which forces those blocks to be replicated. Alternatively, each of file system 114A and storage area replication facility 120A may support a command that communicates only block addresses, allowing file system 114A to communicate the block addresses to storage area replication facility 120A, which reads and synchronizes the blocks internally. This command is referred to as a 'sweep and copy' mechanism.

Quick resynchronization is also needed when secondary node 110B becomes inaccessible and subsequently becomes accessible again while primary node 110A has remained operational. During this downtime of secondary node 110B, updates to storage area 140A have continued. Furthermore, failover has not occurred. This situation is more complicated than primary node failure because local updates have continued, while information required for write fidelity (i.e., the order in which updates occurred) is lost. Storage area replication facility 120A must initiate resynchronization (using, for example, a callback function) to be performed by file system 114A. As with primary node failure, file system 114A sweeps dirty block map 310 and forces storage area replication facility 120A to resynchronize dirty blocks. However, storage area replication facility 120A cannot restart replication until all unsynchronized blocks have been replicated. File system 114A therefore takes steps to ensure that all dirty block maps are marked clean.

One technique for clearing dirty block maps is to make one sweep of the dirty block maps, block further file system update activity, and then make another sweep to clear all of the blocks that were dirtied after the first pass. Alternatively, file system 114A can continue to sweep the dirty block maps until all dirty block maps are cleared. Assuming that the rate of update activity on primary node 110A is slower than the rate at which dirty blocks can be copied to secondary node 110B on average, the sweeps should eventually terminate.

Synchronization is also required when setting up a new replica, and the dirty block logging mechanism described herein can be used for this purpose as well. One embodiment replaces an external utility for traversing useful blocks with an internal file system mechanism. This technique is performed in two logically separate steps. First, all relevant blocks are marked dirty in the dirty block map structures. An administrative command causes a traversal of all file system blocks in use, and these blocks are marked dirty. Only metadata blocks are read and interpreted during the traversal, which is typically less than 5% of the total space in use. In addition, several metadata block structures are read into memory during mounting of the file system. Setting bits and writing dirty blocks to disk incurs minimal overhead of about 1 bit per file system block (less than 0.01% overhead). The second step is to synchronize all dirty blocks using the "sweep and copy" mechanism described above.

The advantage of this method over the combined traversal and copy mechanism described above is that once the first step is completed, subsequent failures of primary and secondary nodes 110A and 1101B can be tolerated. Standard resynchronization mechanisms are activated automatically without need for further administrator intervention.

Once the file system supports a dirty block map as described above, other possible applications of this feature are likely to be discovered. For example, local mirrors of data can be synchronized and/or resynchronized using this technique.

During resynchronization, changes to the dirty block map are written to persistent storage before the data block is written to local disk. However, this technique may degrade file system performance. This degradation can be reduced by the following techniques:

1. Keep in-memory copies of the dirty block map in file system block-sized chunks. Each chunk is itself marked dirty when updated in memory, and marked clean when the changes are written to disk. The in-memory dirty block map is controlled by the file system in the same way as other file system in-core structures (such as buffers).
2. If it is known that the dirty block map on disk has all bits reset, and the in-memory bitmap transitions into the same state, the in-memory dirty block map can be cleared without writing it to disk.
3. Changes affecting metadata blocks are recorded in the file system's transaction log. When transactions in the log are replayed, the dirty block map is also updated for all the metadata blocks that were found in the transaction. A transaction is not marked as completed until the corresponding dirty block map sections have been written to disk.
4. Changes affecting data blocks are normally not recorded in the file system transaction log. A new transaction type can be used that records block numbers only. The new type of transaction can be marked as completed when the corresponding dirty block map sections have been written to disk.
5. Bitmaps that contain only zeroes can be stored in a compressed fashion. A bit in an auxiliary bitmap can be set when the bitmap contains zeroes, and no storage need be allocated for the dirty block map itself.

The bits corresponding to the disk addresses of the dirty block maps themselves are marked with zeroes.

Preferably, administrative commands are available to manage dirty block maps. Since a storage area replication facility need not be present under the file system, dirty block maps should be enabled by administrator command. Actual creation of a dirty block map structure can be deferred until a block represented within a bitmap is actually updated. Similarly, if a storage area replication facility is removed from the underlying storage device, an administrator command should be available to disable dirty block logging, and space allocated for dirty block bitmaps can be freed. In some file systems, it may be possible to store dirty block maps in a sparse structural (hidden) file.

Advantages of the present invention are many. Network bandwidth is conserved by copying only relevant data, and replicas of primary data can be initially synchronized and resynchronized more efficiently than by using known techniques. Having reliable replicas of primary data enables recovery from network or node failure to be performed more quickly, thereby providing consistently available data.

OTHER EMBODIMENTS

In some implementations of replication, instructions for modifying data are transmitted to the secondary node rather than replicating the changed data itself. For example, these instructions may be commands for performing database or file system operations that are performed on a copy of the data at the secondary node. Alternatively, these instructions can be derived by calculating differences between data on the primary and secondary nodes and generating instructions to synchronize the data. In the examples described herein, the changed data are replicated, although the present invention is not limited to such an implementation.

One of skill in the art will recognize that the separation of functionality into a file system and a storage area replication facility is but one example of an implementation of the present invention. Other configurations to perform the same functionality are within the scope of the invention.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A computer-implemented method comprising:
in response to obtaining first data for replication to a secondary storage area, causing an indicator to be set for a first location, wherein
the first data are stored in the first location of a first storage area, and
the indicator indicates that the first data are unsynchronized with corresponding data in a corresponding location of the secondary storage area; and
causing an entry to be added to a list of entries for the first location, wherein each entry in the list is related to an update to data in the first location, and the list can be used to reset the indicator for the first location;
writing a record to a transaction log, wherein the record comprises the first location;
in response to receiving an acknowledgement that the first data have been received at the secondary storage area, causing the first location to be removed from each active transaction of at least one active transaction in the transaction log; and
if one active transaction of the at least one active transaction in the transaction log is completed,
writing a second record to the transaction log indicating that the one active transaction is complete.

2. The method of claim 1 further comprising:
adding an update identifier to the entry.

3. The method of claim 1 further comprising:
in response to receiving the acknowledgement that the first data have been received at the secondary storage area,
causing the entry to be removed from the list of entries for the first location.

4. The method of claim 1, further comprising:
in response to the writing the second record to the transaction log, freeing space in the transaction log previously used by the one active transaction.

5. The method of claim 3 further comprising:
in response to removing the entry from the list of entries for the first location, determining whether the list of entries for the first location is empty; and
if the list of entries for the first location is empty, resetting the indicator for the first location.

6. The method of claim 3 further comprising:
in response to removing the entry from the list of entries for the first location, determining whether the list of entries for the first location is empty, and
if the list of entries for the first location is empty, causing the indicator for the first location to be reset.

7. The method of claim 3 wherein
the causing the entry to be removed from the list of entries for the first location comprises removing the entry from the list of entries for the first location.

8. The method of claim 1 wherein
the causing the indicator to be set comprises setting the indicator.

9. The method of claim 1 wherein
the causing the entry to be added to the list of entries for the first location comprises adding the entry to the list of entries for the first location.

10. The method of claim 1 wherein
if the acknowledgement that the first data have been received at the secondary storage area is not received, causing the indicator to be written to a persistent storage area.

11. The method of claim 10 further comprising:
using the indicator to synchronize the first data in the first location of the first storage area with the corresponding data in the corresponding location of the secondary storage area.

12. A system comprising:
causing means for causing an indicator to be set for a first location in response to obtaining first data for replication to a secondary storage area, wherein
the first data are stored in the first location of a first storage area, and
the indicator indicates that the first data are unsynchronized with corresponding data in a corresponding location of the secondary storage area;
second causing means for causing an entry to be added to a list of entries for the first location, wherein
each entry in the list is related to an update to data in the first location, and
the list can be used to reset the indicator for the first location;
writing means for writing a record to a transaction log, wherein the record comprises the first location;
third causing means for causing the first location to be removed from each active transaction of at least one active transaction in the transaction log in response to receiving an acknowledgement that the first data have been received at the secondary storage area; and
second writing means for writing a second record to the transaction log indicating that one active transaction is complete if the one active transaction of the at least one active transaction in the log is completed.

13. The system of claim 12 further comprising:
fourth causing means for causing the entry to be removed from the list of entries for the first location in response to receiving the acknowledgement that the first data have been received at the secondary storage area.

14. The system of claim 13 further comprising:
determining means for determining whether the list of entries for the first location is empty in response to removing the entry from the list of entries for the first location; and
resetting means for resetting the indicator for the first location if the list of entries for the first location is empty.

15. A computer-readable medium comprising:
causing instructions to cause an indicator to be set for a first location in response to obtaining first data for replication to a secondary storage area, wherein
the first data are stored in the first location of a first storage area, and
the indicator indicates that the first data are unsynchronized with corresponding data in a corresponding location of the secondary storage area, and
second causing instructions to cause an entry to be added to a list of entries for the first location, wherein
each entry in the list is related to an update to data in the first location, and
the list can be used to reset the indicator for the first location;
writing instructions to write a record to a transaction log, wherein the record comprises the first location;

third causing instructions to cause the first location to be removed from each active transaction of at least one active transaction in the transaction log in response to receiving an acknowledgement that the first data have been received at the secondary storage area; and second writing instructions to write a second record to the transaction log, wherein the second record indicates that one active transaction of the at least one active transaction in the transaction log is completed.

16. The computer-readable medium of claim 15 further comprising:

fourth causing instructions to cause an update identifier to be added to the entry.

17. The computer-readable medium of claim 15 further comprising:

fourth causing instructions to cause the entry to be removed from the list of entries for the first location in response to receiving the acknowledgement that the first data have been received at the secondary storage area.

18. The computer-readable medium of claim 17 further comprising:

determining instructions to determine whether the list of entries for the first location is empty in response to removing the entry from the list of entries for the first location; and resetting instructions to reset the indicator for the first location if the list of entries for the first location is empty.

19. A computer system comprising:

a processor, and the computer-readable medium of claim 15, wherein the computer-readable medium is coupled to the processor.

20. A system comprising:

a processor; and a memory, wherein the memory comprises:

a causing module to cause an indicator to be set for a first location in response to obtaining first data for replication to a secondary storage area, wherein the first data are stored in the first location of a first storage area, and the indicator indicates that the first data are unsynchronized with corresponding data in a corresponding location of the secondary storage area, and a second causing module to cause an entry to be added to a list of entries for the first location, wherein each entry in the list is related to an update to data in the first location, and the list can be used to reset the indicator for the first location;

a writing module to write a record to a transaction log, wherein the record comprises the first location;

a third causing module to cause the first location to be removed from each active transaction of at least one active transaction in the transaction log in response to receiving an acknowledgement that the first data have been received at the secondary storage area; and a second writing module to write a record to the transaction log indicating that one active transaction is complete if the one active transaction of the at least one active transaction in the transaction log is completed.

21. The system of claim 20 further comprising:

a fourth causing module to cause an update identifier to be added to the entry.

22. The system of claim 20 further comprising:

a fourth causing module to cause the entry to be removed from the list of entries for the first location in response to receiving the acknowledgement that the first data have been received at the secondary storage area.

23. The system of claim 22 further comprising:

a determining module to determine whether the list of entries for the first location is empty in response to removing the entry from the list of entries for the first location; and a resetting module to reset the indicator for the first location if the list of entries for the first location is empty.

24. The method of claim 1, wherein a file system sets the indicator for the first location; and the file system adds the entry to the list of entries for the first location.

25. The method of claim 3, wherein a replicator receives the acknowledgement; and the replicator causes a file system to remove the entry from the list of entries for the first location.

26. The method of claim 1, wherein a replicator receives the acknowledgement;

the replicator causes a file system to remove the first location; and the file system writes the second record indicating that the one active transaction is completed.

27. A method comprising:

causing an indicator to be set for a first location in response to obtaining first data for replication to a secondary storage area, wherein the first data are stored in the first location of a first storage area, and the indicator indicates that the first data are unsynchronized with corresponding data in a corresponding location of the secondary storage area;

causing an entry to be added to a list of entries for the first location, wherein each entry in the list is related to an update to data in the first location, and the list can be used to reset the indicator for the first location;

determining whether the list of entries for the first location is empty in response to removing the entry from the list of entries for the first location; and resetting the indicator for the first location if the list of entries for the first location is empty, wherein the file system resets the indicator.

28. The system of claim 12, wherein a file system sets the indicator for the first location; and the file system adds the entry to the list of entries for the first location.

29. The system of claim 13, wherein a replicator receives the acknowledgement; and the replicator causes a file system to remove the entry from the list of entries for the first location.

30. The system of claim 12, wherein a replicator receives the acknowledgement;

the replicator causes a file system to remove the first location; and the file system writes the second record indicating that the one active transaction is completed.

31. A system comprising:

causing means for causing an indicator to be set for a first location in response to obtaining first data for replication to a secondary storage area, wherein the first data are stored in the first location of a first storage area, and the indicator indicates that the first data are unsynchronized with corresponding data in a corresponding location of the secondary storage area;

second causing means for causing an entry to be added to a list of entries for the first location, wherein
each entry in the list is related to an update to data in the first location, and
the list can be used to reset the indicator for the first location;

determining means for determining whether the list of entries for the first location is empty in response to removing the entry from the list of entries for the first location; and resetting means for resetting the indicator for the first location if the list of entries for the first location is empty, wherein
the file system resets the indicator.

32. The computer-readable medium of claim 15, wherein a file system sets the indicator for the first location; and
the file system adds the entry to the list of entries for the first location.

33. The computer-readable medium of claim 17, wherein a replicator receives the acknowledgement; and
the replicator causes a file system to remove the entry from the list of entries for the first location.

34. The computer-readable medium of claim 15, wherein a replicator receives the acknowledgement;
the replicator causes a file system to remove the first location; and
the file system writes the second record indicating that the one active transaction is completed.

35. The computer-readable medium of claim 18, wherein the file system resets the indicator.

36. The system of claim 20, wherein
a file system sets the indicator for the first location; and
the file system adds the entry to the list of entries for the first location.

37. The system of claim 22, wherein
a replicator receives the acknowledgement; and
the replicator causes a file system to remove the entry from the list of entries for the first location.

38. The system of claim 20, wherein
a replicator receives the acknowledgement;
the replicator causes a file system to remove the first location; and
the file system writes the second record indicating that the one active transaction is completed.

39. The system of claim 23, wherein the file system resets the indicator.

* * * * *